Patented Apr. 24, 1951

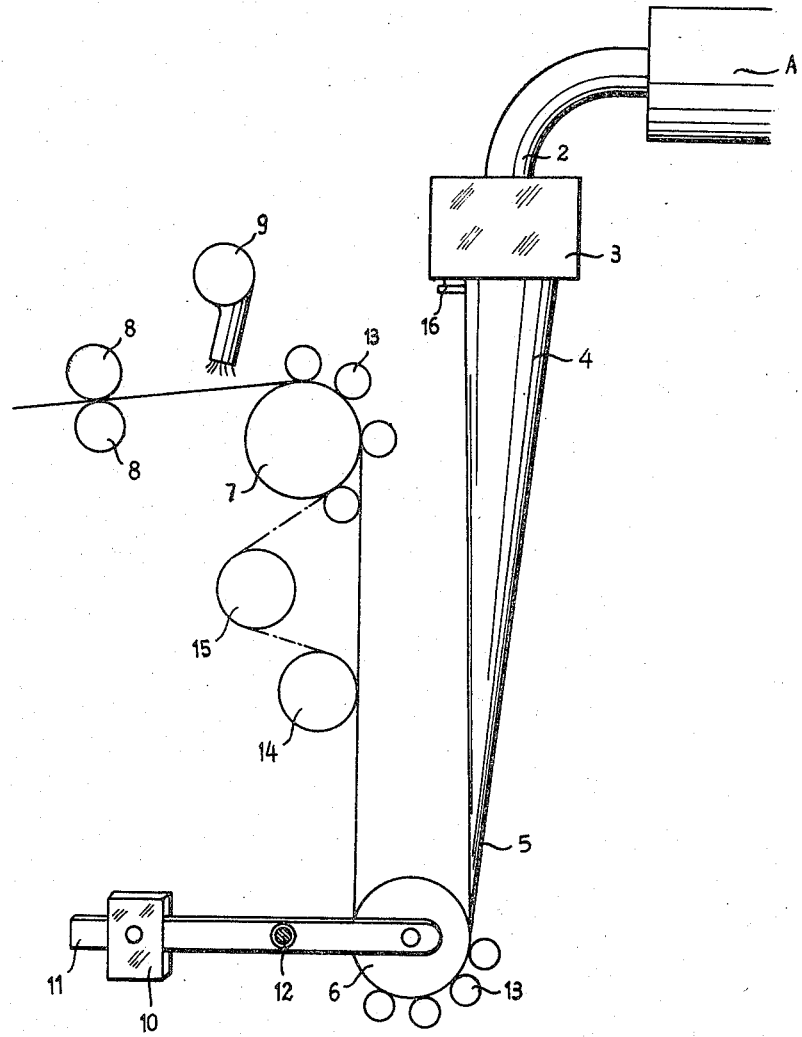

2,550,225

UNITED STATES PATENT OFFICE 2,550,225

METHOD AND APPARATUS FOR MANUFACTURING RIBBONS OF PLASTIC MATERIAL

Roberto Colombo, Turin, Italy

Application February 19, 1948, Serial No. 9,585
In Italy March 28, 1945

4 Claims. (Cl. 18—14)

This invention relates to processes and apparatus for the manufacture of sheets and ribbons of any desired width from thermoplastic materials by an extrusion operation.

In the manufacture of sheets and ribbons of large size from thermoplastic materials which do not tend to stick, preferably calenders with two, three or four cylinders have hitherto been employed. When treating materials such as cellulose derivatives (cellulose acetate, benzylcellulose, celluloid, etc.), these materials are usually dissolved by means of suitable solvents, thoroughly mixed together and formed in large blocks which are allowed to dry after compression; from these blocks sheets are cut, which are then properly dressed.

These known methods require clumsy and expensive plants. Moreover, the use of solvents which are difficult to recover, implies tedious operations and expensive machinery.

The main object of this invention is to simplify the manufacture of sheets and ribbons of plastic material of any kind without the use of solvents. The thermoplastic material is extruded from a nozzle delivering a tube, which is split and successively flattened to sheet form.

A sheet thus manufactured would not be smooth, especially if made from stiff material, as on directly collecting the ribbon issuing from the die, irregular drawing cannot be avoided.

An object of this invention is to provide a process wherein drawing is carried out through yieldable means at a temperature lower than the extrusion temperature, so that the material issuing from the die is uniformly flattened, and an ultimate ribbon uniform in thickness is obtained.

A further object of this invention is to provide an apparatus simple in construction and reliable in operation, comprising an extruder, the die axis of which is vertical, a first-flattening cylinder mounted on an oscillating weighted arm below the die, a second flattening cylinder arranged above the first cylinder so that the ribbon surrounds substantially 180° of the circumference of the first cylinder and a pair of drawing rollers laterally disposed of the second cylinder. The flattening cylinders are provided with heating means, by which they may be maintained at a temperature lower than the extrusion temperature.

A further object is to provide an apparatus of the above-described type, in which one or a plurality of the compressing cylinders cooperate with the flattening cylinders, so as to ensure a correct flattening of the ribbon. A fan arranged between the second flattening cylinder and the pair of drawing rollers serves for cooling the ribbon before it is wound upon a collecting roller.

The accompanying drawing shows diagrammatically an apparatus for carrying out the process according to the invention.

A denotes the extrusion press ejecting plastic material through the bent conduit 2 into the extrusion nozzle 3, from which the material issues in the form of a tube having a vertical axis.

The tube 4 is cut along a generatrix, as it issues from the nozzle, by means of a cutter blade 16, and is thereupon suitably spread and flattened, forming a ribbon 5, which is passed over the cylinder 6 heated at a temperature below the extrusion temperature. The flattening cylinder 6 is advantageously arranged underneath the extruder 3 and laterally displaced with respect to the axis of the tube issuing from the extruder, so that the generatrix of the tube extending through the blade 16 is simultaneously tangential to the circumference of the extruder nozzle and to the circumference of the flattening cylinder. In this manner the ribbon is subjected as it is formed to a practically uniform drawing. The ribbon travels around the cylinder 6, rises vertically up to a second flattening cylinder 7, also heated to a temperature lower than the extrusion temperature, passes around said cylinder, extends in a substantially horizontal direction, travels between two drawing rollers 8 and is ultimately wound on a collecting drum, not shown. Ahead of the rollers 8 a blast cooler 9 acts upon the ribbon. The flattening cylinder 6 is rotatably mounted at an end of a frame 11 pivoted at 12 and carrying at its other end a weight 10, which may be adjusted in position with respect to the pivot 12, in order to adjust the extent of drawing exerted on the ribbon by the pair of drawing rollers 8. Under the drawing action of the rollers 8, the material, which has been cooled by the cooler 9, is smoothed to remove any unevenness by cylinders 7 and 6, of which the latter perfectly flattens out the tube cut into sheet form.

In order to polish the surface of the ribbon issuing from the nozzle 3, it may be convenient to generate on the ribbon, as it travels over the cylinders 6 and 7, a slight pressure by means of rollers 13, also heated at a temperature below the extrusion temperature, which are pushed by suitable means towards the cylinders 7 and 6, respectively.

The cylinders 6 and 7 and rollers 13 are hollow and are heated in the usual manner, by passing therethrough a hot fluid admitted through their hollow pivots.

In some cases it may be useful to increase the number of cylinders over which the thermoplastic ribbon travels, by providing for instance cylinders such as shown by broken lines at 14 and 15.

What I claim is:

1. Method of manufacturing ribbons from thermoplastic material free from solvents, which comprises extruding the thermoplastic material in tube form, so as to form a tube corresponding in circular development to the desired ribbon width, cutting the tube along a generatrix as it is formed, flattening the cut tube to ribbon form while subjecting the flattened ribbon to an adjustable tension parallel to the length of the ribbon, subjecting the ribbon while flattening it to a slight pressure and simultaneously heating at a temperature lower than the extrusion temperature, in order to polish said ribbon and remove any unevenness due to previous extrusion, cooling the ribbon after flattening and drawing the cooled ribbon.

2. Method of manufacturing ribbons from thermoplastic material free from solvents, which comprises extruding the thermoplastic material in tube form, so as to form a tube corresponding in circular development to the desired ribbon width, cutting the tube along a generatrix as it is formed, flattening the cut tube to ribbon form while subjecting the flattened ribbon to an adjustable tension parallel to the length of the ribbon, subjecting the ribbon while flattening it to a slight pressure at a plurality of pressure points, simultaneously heating it to a temperature lower than the extrusion temperature, cooling the ribbon after flattening and drawing the cooled ribbon.

3. Apparatus for manufacturing ribbons from thermoplastic material free from solvent, comprising an extruder, a cutter facing said extruder, a first flattening cylinder, means for permitting the parallel displacement of the axis of said first flattening cylinder so as to exert an adjustable tension on the flattening ribbon, a plurality of rollers having a diameter smaller than the diameter of the flattening cylinder and arranged so as to exert a slight pressure on the ribbon in contact with the flattening cylinder, a second flattening cylinder substantially so arranged that the ribbon surrounds the first mentioned cylinder substantially over 180° of its circumference, a plurality of rollers having a diameter smaller than the second mentioned cylinder and arranged so as to exert a slight pressure on the ribbon in contact with the second flattening cylinder, a blast cooler acting upon the ribbon issuing from said second flattening cylinder, and a pair of counter-rotating rollers having equal diameters drawing the flattened ribbon progressively away from said second cylinder.

4. Apparatus for manufacturing ribbons from thermoplastic material free from solvent, comprising an extruder, a cutter facing said extruder, a first flattening cylinder, means for permitting the parallel displacement of the axis of said first flattening cylinder so as to exert an adjustable tension on the flattening ribbon, a plurality of rollers having a diameter smaller than the diameter of the flattening cylinder and arranged so as to exert a slight pressure on the ribbon in contact with the flattening cylinder, a second flattening cylinder substantially so arranged that the ribbon surrounds the first mentioned cylinder substantially over 180° of its circumference, a plurality of rollers having a diameter smaller than the second mentioned cylinder and arranged so as to exert a slight pressure on the ribbon in contact with the second flattening cylinder, a blast cooler acting upon the ribbon issuing from said second flattening cylinder, a pair of counter-rotating rollers having equal diameters drawing the flattened ribbon progressively and continuously away from said second cylinder, and means for heating the flattening cylinders and cooperating rollers to a temperature lower than the extrusion temperature.

ROBERTO COLOMBO.

REFERENCES CITED

The following references are of record in the file of this patent:

UNITED STATES PATENTS

| Number | Name | Date |
| --- | --- | --- |
| 2,177,660 | Kimble et al. | Oct. 31, 1939 |
| 2,421,132 | Tornberg | May 27, 1947 |

FOREIGN PATENTS

| Number | Country | Date |
| --- | --- | --- |
| 431,619 | Great Britain | Oct. 25, 1934 |